Figure 1:
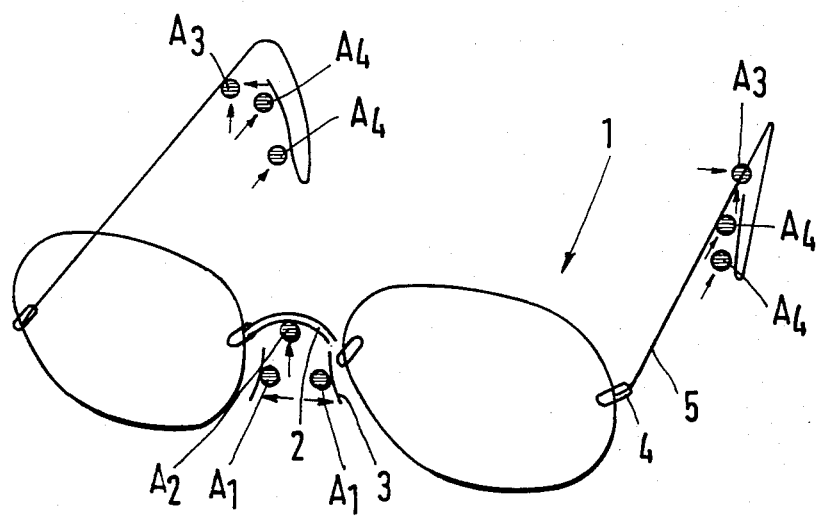

U
nited States Patent [19]

Anger et al.

[11] Patent Number: 4,873,994
[45] Date of Patent: Oct. 17, 1989

[54] DEVICE FOR DETERMINING THE FORCES IN THE AREA OF THE CONTACT SURFACES BETWEEN A SPECTACLE FRAME AND THE HEAD OF THE WEARER

[75] Inventors: Wilhelm Anger, Moritz-Suvretta; Christoph Leuzinger, Zufikon, both of Switzerland

[73] Assignee: Eyemetrics-Systems AG, Steinbockstrasse, Switzerland

[21] Appl. No.: 303,055

[22] Filed: Jan. 26, 1989

Related U.S. Application Data

[63] Continuation of Ser. No. 898,715, Aug. 21, 1986, abandoned.

[30] Foreign Application Priority Data

Mar. 24, 1986 [DE] Fed. Rep. of Germany ....... 3610897

[51] Int. Cl.⁴ .............................................. A61B 5/00
[52] U.S. Cl. .................. 128/774; 73/862.64; 73/862.65; 33/200; 351/41; 351/177
[58] Field of Search ............ 128/774; 73/862.64, 73/862.65; 351/41, 177, 178; 33/200

[56] References Cited

U.S. PATENT DOCUMENTS

| | | | |
|---|---|---|---|
| 2,935,213 | 5/1960 | Cellitti et al. | 73/862.65 |
| 3,031,152 | 4/1962 | Cohen et al. | 73/862.65 |
| 3,151,306 | 9/1964 | Hines | 73/862.64 |
| 3,418,850 | 12/1968 | Goddin | 73/862.64 |
| 3,566,679 | 3/1971 | Toftness | 73-78/ |
| 3,760,637 | 9/1973 | Budinger et al. | 73/141 |
| 4,047,584 | 9/1977 | Daly | 73/862.65 |
| 4,167,869 | 9/1979 | Gikes | 73/141 |
| 4,380,171 | 4/1983 | Smith | 73/862.65 |
| 4,426,884 | 1/1984 | Polchaninoff | 128/774 |
| 4,503,705 | 3/1985 | Polchaninoff | 128/774 |
| 4,628,583 | 12/1986 | Bawnett | 73/862.65 |
| 4,667,512 | 5/1987 | Buddwalk | 73/862.65 |

OTHER PUBLICATIONS

Braun et al., Experimental Mechanics, Jun. 1979, pp. 214–219.

Primary Examiner—Kyle L. Howell
Assistant Examiner—John C. Hanley
Attorney, Agent, or Firm—Roth & Goldman

[57] ABSTRACT

Described is a device for testing for a perfect fit of spectacle frames on the head of the spectacle wearer. The device has at least one plate- or blade-shaped force or pressure sensor, which is mounted on a holder and can be applied to the respective contact surfaces between the frame and head. With this device it is possible to make precise measurements of the forces and pressures actually occurring at each individual point so that they can be reproduced, for example, by raising the frame slightly, introducing the pressure sensor to the pertinent point of contact, and lowering the frame down again. Because of the negligible structural height of the pressure sensor, the individual contact areas between the frame and head can be tested without having to make any change in the controlled vane position in space existing when the spectacles are worn in place.

15 Claims, 16 Drawing Sheets

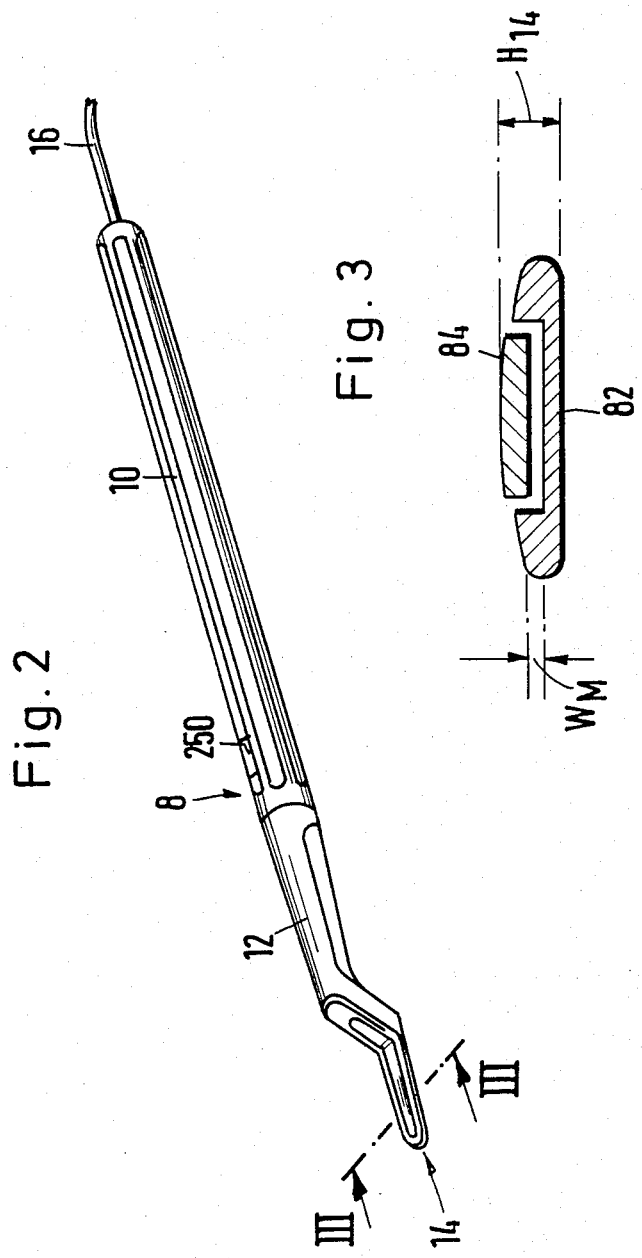

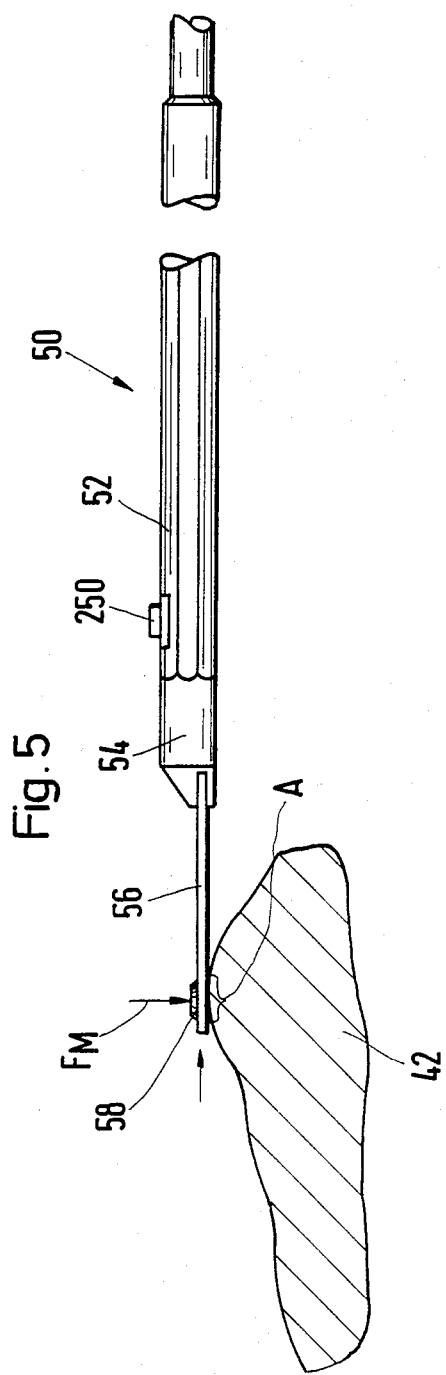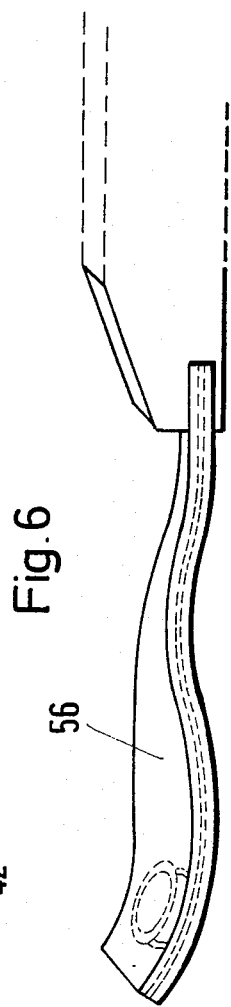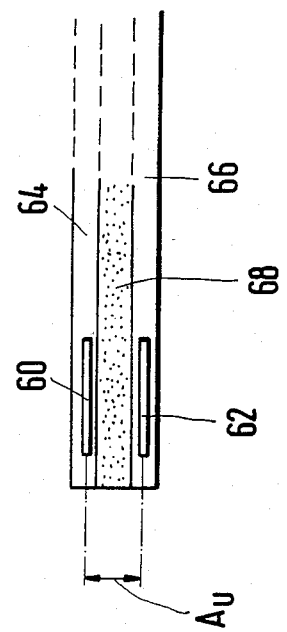

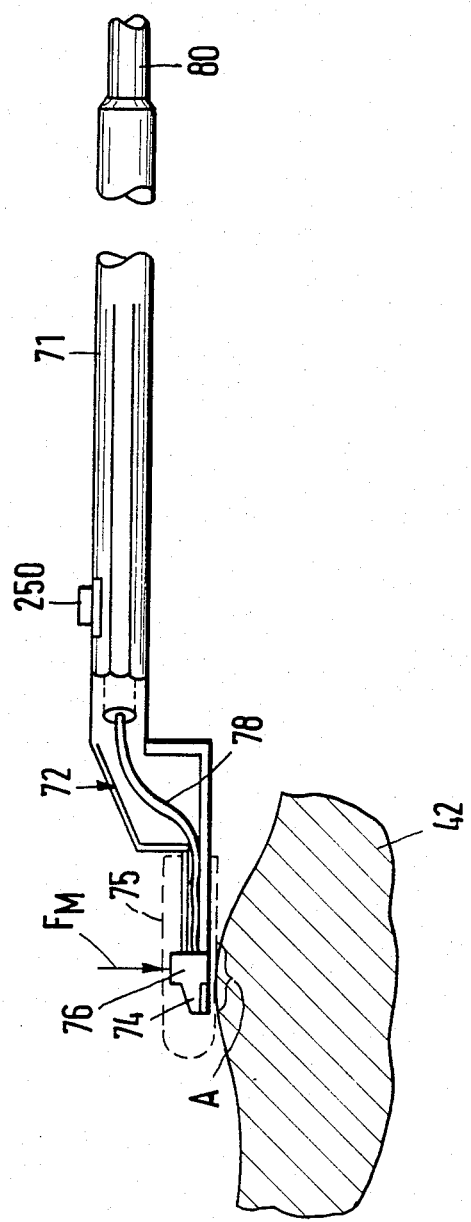

DEVICE FOR DETERMINING THE FORCES IN THE AREA OF THE CONTACT SURFACES BETWEEN A SPECTACLE FRAME AND THE HEAD OF THE WEARER

This application is a continuation (in part) of U.S. application Ser. No. 06/898,715 filed Aug. 21, 1986 by inventor(s) Wilhelm Anger and Christoph Leuzinger.

FIELD OF THE INVENTION

The present invention relates to a force measurement device for determining the magnitude of contact forces between various points on a frame for eyeglasses and the head of the wearer.

PRIOR ART AND ITS CRITICISM

When the spectacles are worn in place, the spectacle frame touches the head of the spectacle wearer at many points, e.g. in the area of the flanks of the nose, the base of the nose and the ears. As soon as a pressure exceeding a variously high threshold from one spectacle wearer to the next is exercised on one of the points of contact, complications can arise in wearing the spectacles which considerably effect the sense of well-being of the spectacle wearer.

On the basis of a recognition of this fact an attempt has been made to calculate the pressure load on the contact surfaces between the spectacle frame and the head of the spectacle wearer from the weight of the spectacles and the form of the spectacle frames. This computation, however, has been proved to be unreliable since it must necessarily proceed from idealized circumstances which do not exist in practice, so that the results of the computation do not reflect the special load conditions with sufficient precision for the individual wearer of the spectacles. Adding to the difficulty is the fact that it is those particular individual tensions of the spectacle frame which arise if the spectacles are not sitting properly that can cause such an increase in pressure on a certain neuralgic zone of contact such as the wearer of the spectacles will find extremely uncomfortable after a fairly long period of wearing the spectacles.

Object of the Invention

The present invention is based on the objective of furnishing a device with which the fit of a spectacle frame on the head of the spectacle wearer can be exactly determined.

SUMMARY AND ADVANTAGES OF THE INVENTION

The object in accordance with the present invention creates a force-measuring probe in the form of a pressure measurement transmitter or sensor, which probe is so designed that it can be brought to the contact points between the spectacle frame and the head of the spectacle wearer. This can be accomplished in such a manner, for example, that the individual force or pressure sensors can be placed at the respective contact surfaces with the spectacles removed and that the spectacles can subsequently be set into position. A further possibility for an application of the device in accordance with the present invention is that of introducing one pressure sensor or several pressure sensors between the frame and the head of the spectacle wearer and then of bringing the frame into its proper position in place again. With a device of this sort the forces arising when the spectacle frame is worn in place can be determined exactly for each individual instance. It has been demonstrated that pressure measurement sensors operating with sufficient precision can be manufactured that can be shaped sufficiently flat that no detectable change occurs with the pressure sensor inserted between the spectacle frame and the head in the relative position in space between the spectacle frame and the head. This opens the possibility of working with one single measuring probe and of applying it at various points and in succession to the different contact points between the spectacle frame and the head and of measuring the forces there without in so doing the distort the forces arising in the natural wearing of the spectacles an any unreliably large degree.

A simple measuring instrument in the shape of a simple measuring probe represents a handy working instrument for the ophthalmologist or optician in testing the fit of the spectacle frame.

A relatively wide range is available for the design of the pressure sensor. It will be useful for it to be very flat, in the magnitude of up to a thickness of 0.8 mm, for example. Thus a lobe-like formation can be employed, for example, that adapts itself to the contact area in several directions. In order to afford a defined load direction of the pressure sensor, it will be of service to equip it with a defined measurement contact area. This measurement contact area can be determined with the purpose in mind not only according to position, but also according to size, in order by this means to define the measurement site exactly and in a manner susceptible to reproduction and to obtain a reading showing the pressure load.

As already mentioned in the above, the contact surfaces between the spectacle frame and the head of the spectacle wearer are not only variously situated in space, but in addition are also variously formed with respect to their geometry. Thus, for example, the contact areas in the region of the nose flanks are practically level, in contrast to which in the region of the nose root and in the area where the ear begins it is a matter of a junction between two surfaces, each of which is curved in two levels. In order to take reproducible and exact measurements at these sites, to which, moreover, access is often difficult, it will be useful to design the force measurement transmitter in with a protruding end which has a shape approximately that of the head surface it is intended to contact. This design can be employed at the same time for ease in introducing the pressure sensor into the contact area of each position to be measured.

Pressure sensors with the criteria described above in respect of slight height of structure and sufficiently high resolving property for the measurement of forces in the range of between some 1 to 100 mN can work on the basis of different physical effects. The mechanical part of the pressure measurement transmitter is constituted in a preferable manner by a probing tongue pair, which functions as a displacement pick-up in the area of the measuring spot to be scrutinized. In this manner the length that is in any event required in order to form a fine and, if necessary, narrow tip on the pressure measurement sensor can be applied in affording a suitable transmission of path and/or force, which then can in turn be employed as the electrically operating signal converter of measurement data. A resistive wire strain may be employed as a measurement data signal converter since in this manner the defined bending point can be optimized independently of the configuration of the probing tongues. A further advantage of this embodiment lies in the fact that the measurement data signal converter can be installed at a point situated at a relatively great distance from the actual measuring point, so that it will be protected from external influences to the greatest possible extent. The scanning tongues and signal conversion element may be permanently connected to the pressure sensor head whereby a simple and sturdy structure will be the result. The probing tongue connected to the pressure sensor head and to the element equipped with the bending point may not in this embodiment, however, be used as a displacement pick-up, so that where extremely small forces are to be measured, distortions of the measurements can occur by virtue of the fact that the pressure sensor having this firm probing tongue is pressed onto the contact surface with forces of various magnitudes.

It is possible successfully to protect the very thinly shaped probing tongue against critical lateral loads by mounting it in a recess in the pressure sensor head. To improve this protective effect provision can be made for the outer surface of the movable probing tongue to be shaped convexly or spherically, so that the pressure sensor can be shoved without any problem between the spectacle frame and the head of the spectacle wearer without in so doing damaging the measurement scanning tongue.

In lieu of measuring by means of a wire strain gauge. A piezoelectric element can be employed, which gives off a tension essentially proportional to the effective force. This piezoelectric element is installed essentially at the same location as the element equipped with the nominal bending point.

A likewise extremely simple embodiment from the standpoint of outlay for technical devices will be afforded if the pressure sensor is operated pneumatically. This variant has the advantage that the measurement transmitter tip can be formed more stably in the shape of a closed concave profile. In this variant a large free space is also opened with respect to the shape of the pressure sensor tip, so that all contact points between the spectacle frame and the head of the spectacle wearer can be tested in the best manner possible through a suitable choice of measurement transmitter tip. In this embodiment the synthetic bubble itself can define the measuring point with its section protruding from the measurement transmitter head. It is also possible, however, for this segment of the synthetic bubble to carry a separate element which serves to shape the defined measuring point, which can possibly be provided with a predetermined surface.

If the synthetic bubble protrudes from both surfaces of the pressure sensor head, the exactitude in measurement of this device can be enhanced. This tip of the pressure sensor head can be controlled in this manner for placing in the region of the contact surface by having the physician or optician constantly monitor the contact pressure applied.

If the pressure sensor gives off an electrical signal, the possibility is afforded of furnishing an exact signal processing and evaluation with little lag time.

The pressure sensor can also function purely according to the piezoelectrical principle. In this instance the same advantages will be gained with respect to the shape of the pressure sensor head as have been described in the above in connection with the pneumatic displacement pick-up. This method of measurement is advantageous in the fact that the piezoelectrical crystal element is not detectably or visibly deformed under the effect of force. The thickness of the pressure sensor tip can be reduced in this manner in relation to the above described solution variants by the extent of the maximum displacement pick-up.

The use of the piezoelectric effect in measuring force has in addition to this the advantage that the piezoelectrical element can be fixed in place relatively simply in the tip of the pressure sensor head since there are no detectable deformations of the measurement data receiver to take into account. In this variant especially care should be taken with simple measures that the piezoelectrical crystal protrudes both from the one side of the pressure sensor head facing the spectacle frame and from the other side facing the surface of the head. In this manner the physician or optician handling the device in accordance with the present invention can check with certainty in applying the pressure measuring probe whether he has inadvertently used too much force in approaching the spot to be measured.

The solution variants discussed above taken together all have in common the fact that a pressure or displacement receiver is accommmdated in a pressure sensor head shaped somewhat similar to a casing. In order to make certain that the pressure or displacement receiver is free of extraneous compulsive forces during the measuring process, such as could possibly be introduced from the holder or mounting support, it will be advantageous if between the pressure sensor head and the holder or mounting support there is a hinge intervening with preferably several degrees of freedom, so that the pressure or displacement receiver can direct itself normally with its sensitizing direction to the respective contact surfaces. A flexible foil can be put to use as the carrier of the force receiver, such as, for example, a plastic foil, which in itself alone contains the above described hinge effect between the force receiver and the holder. For this purpose it will be especially advantageous to proceed with a sandwich structure of the foil, whereby the two covering foils bear the signal transmitter together with the electrical terminals. An intervening layer will function as a stabilizing matrix suitable to adapting as well as possible to the contact surfaces, which matrix admits and determines the controlled angular vane position in space of the signal transmitter directed in dependence upon the normal forces affecting the foil. In using this configuration, care can be taken for the pressure sensor to be sensitized to detect forces only on a precisely prescribed area and defined in size, through which means the measuring point can be determined and exactly recorded and the force measured can be converted into a magnitude of pressure. Such a sandwich foil, even with integration of the signal transmitters can be extremely thin in shape, so that the fit of the spectacles will not be detectibly affected by the introduction of the foil at any point of contact between the frame and the head of the spectacle wearer.

If the foil has raised points at various locations for determining the measuring point, the measuring point can be determined more exactly and the stressing profile over certain larger stretches of contact can be ascertained with more precision.

The intervening layer can be formed to advantage by a soft plastic inlay can be compressed under pressure. If this is the case, when the above-mentioned signal transmitters are used, the very slightest deformations of the soft plastic inlay will suffice to assure a resolution of sufficient size of the pressure measurement. When especially the capacitive principle is employed, the very slight thickness of the foil meets the measuring precision of the device since the resolution capability of a displacement measuring system operating capacitively grows to be larger and larger the closer the condenser elements move toward one another.

As caused by the very flat structure of the pressure sensor, checking the fit of a spectacle frame can be accomplished with the additional help of a simple probe to be applied sequentially on the various areas of contact between the spectacle frame and the head of the spectacle wearer, whereby the individual measurement data are either recorded in a register or stored in a memory. However, it is also possible for conduct the examination by applying a multiple probe to the various points of contact.

With a multiple probe of this type, for example, the entire area of contact between the bridge of the frame and the nose can be checked to find the best fit possible. By virtue of the sluable pressure sensor heads, an approximate adjustment can be made in order to exclude any possible compulsive forces as discussed above in case of a planned automatic thrust of the collective holder.

Just as with the simple probe, in which the measurement sensor head is attached with a handle, it will also be necessary to make provision in the case of a simple probe, possibly through a hinge device, for the individual pressure sensors to point without forcing vertically to the contact area normals between the spectacle frame and the contact areas of the head. This can be best accomplished by a three-dimensional hinge, for example a universal coupling. In order to be able to manipulate with pressure sensor with still more certainty, it will be advantageous for the hinge device to be stabilized at least with a spring device when the pressure sensor is applied to the measuring point. The embodiment in accordance with Patent claim 34 will then offer the advantage that the stabilization by means of a spring can no longer distort the measurement data at the moment the measurement is taken. Use of a memory device connected to a signal evaluation circuit which stores measurement data will be of especial advantage in forming an overall view of the fit of the spectacle frame following a sequential examination of the various points of support between the spectacle frame and the head of the spectacle wearer. By means of the indicator device all stress values taken in sequence are made visible in correlation to one another, so that a comprehensive overview can be furnished, despite the fact that measurements have been taken point by point.

Figure 4:
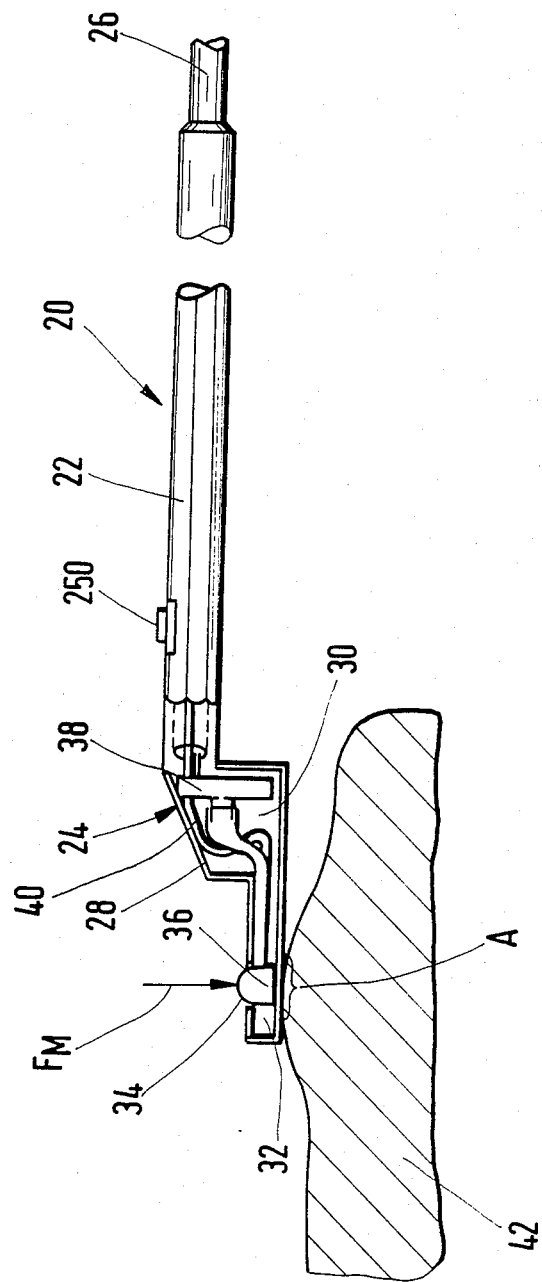
Figure 9:
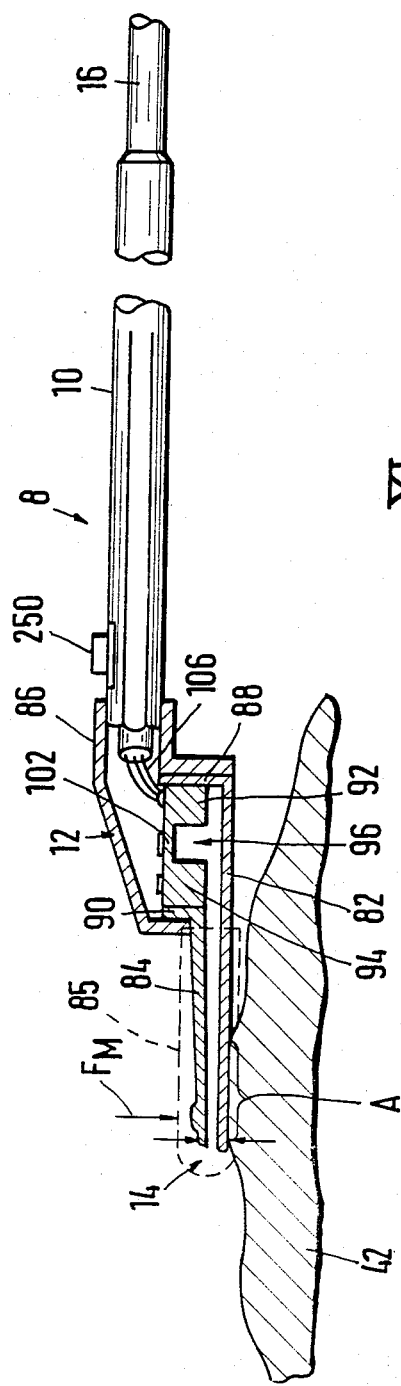
Figure 10:
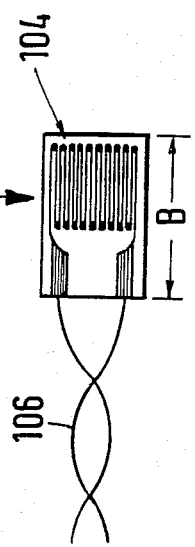
Figure 11:
Figure 12:
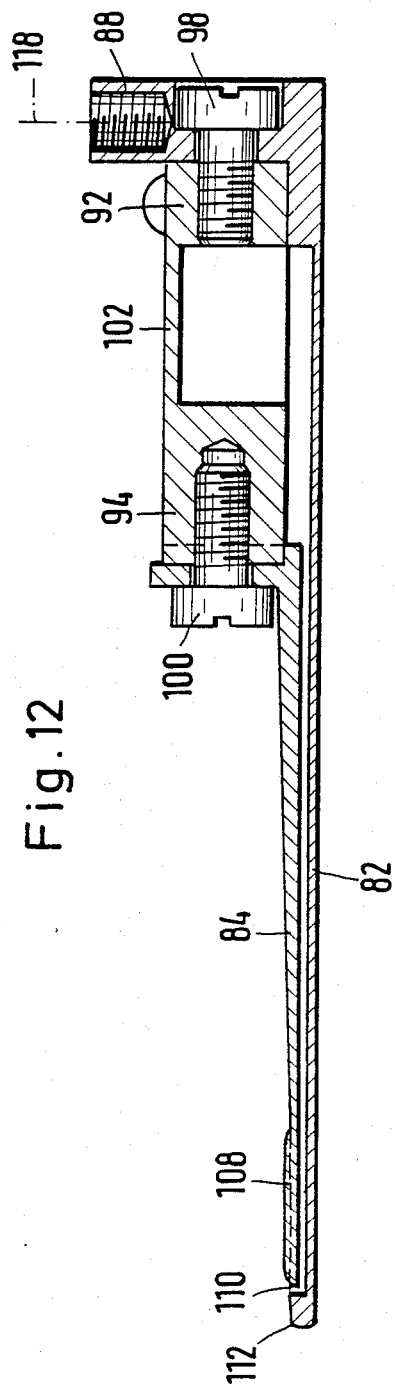
Figure 13:
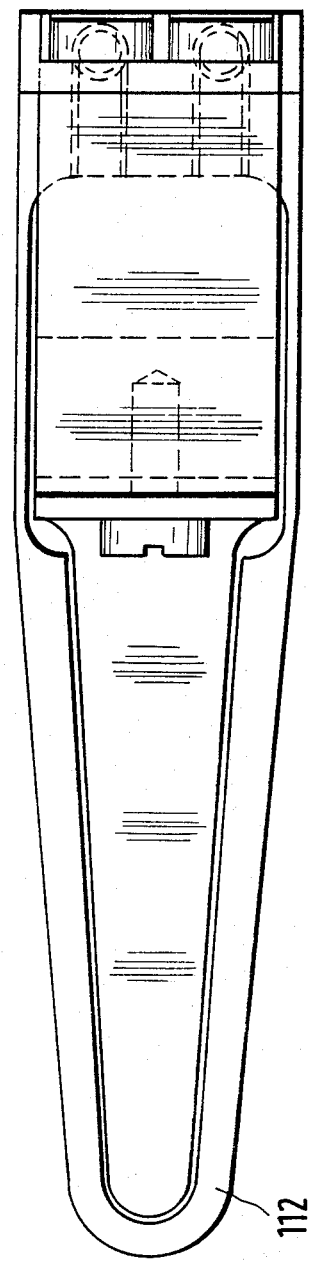
Figure 14:
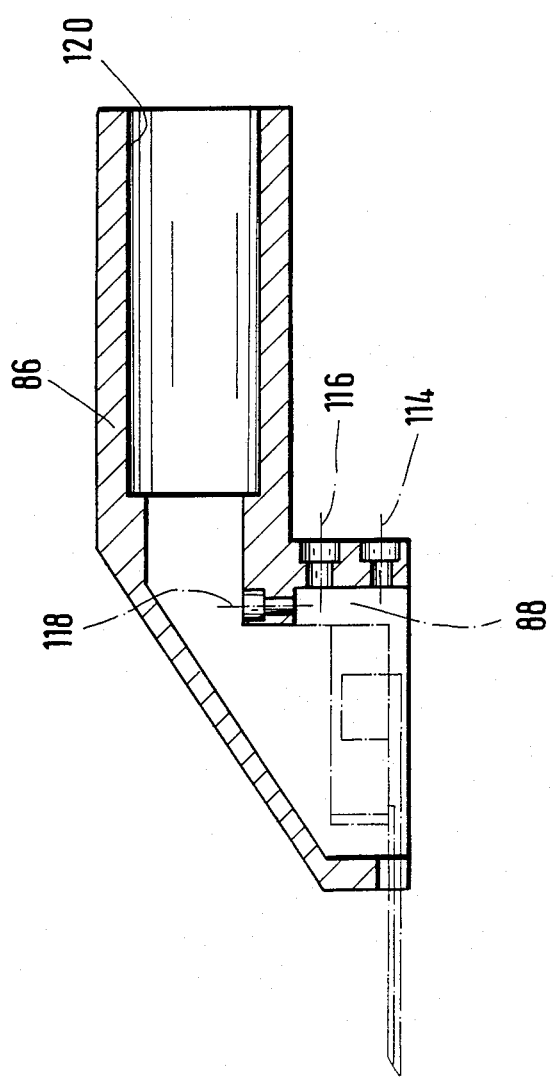
Figure 15:
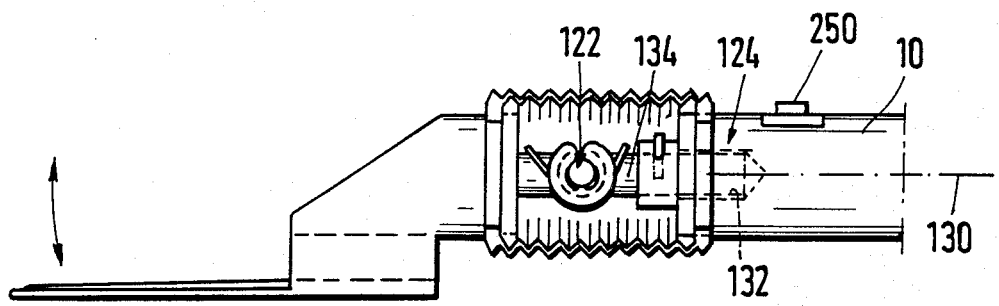
Figure 16:
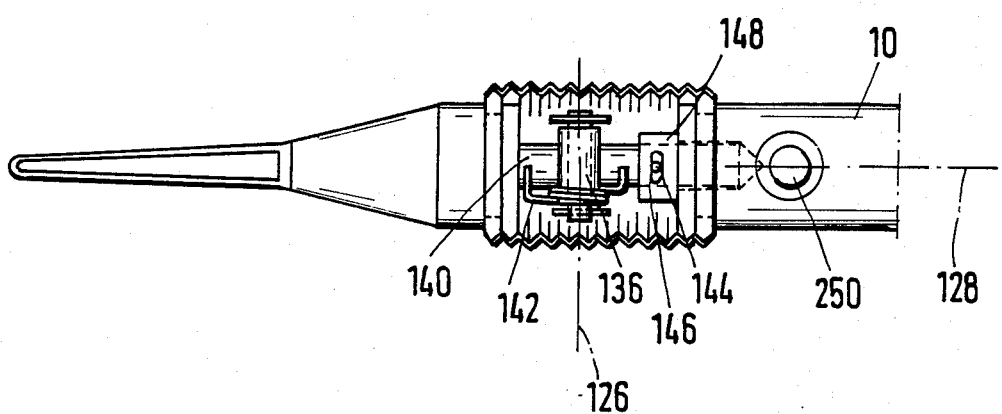
Figure 17:
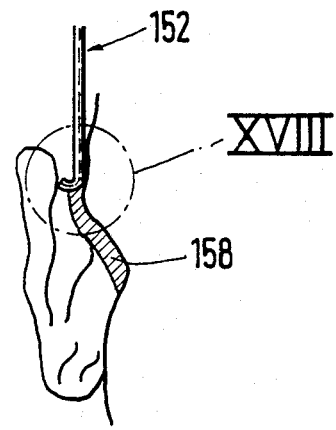
Figure 18:
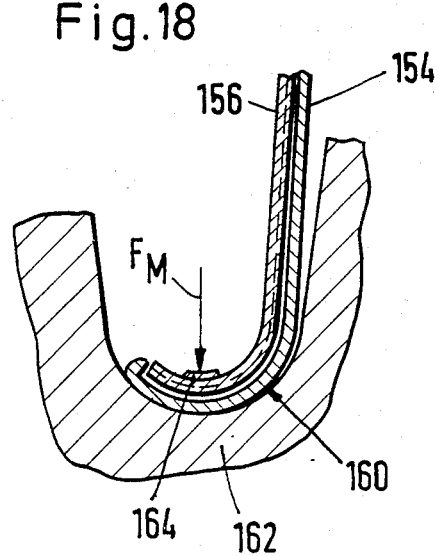
Figure 19:
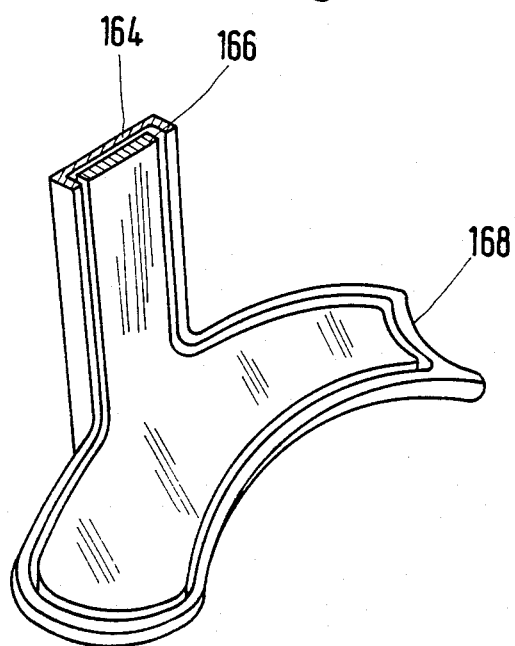
Figure 20:
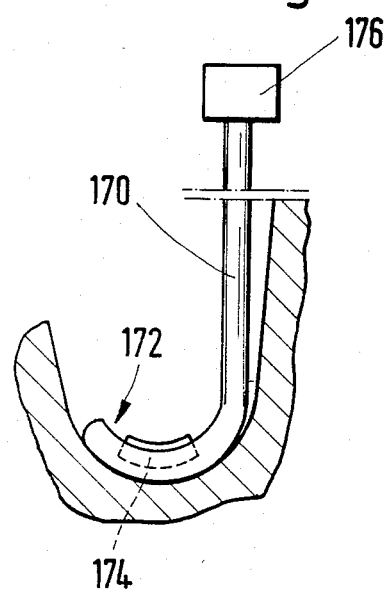
Figure 21:
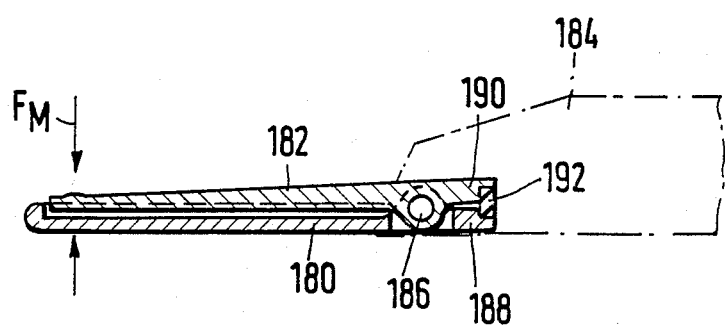
Figure 22:
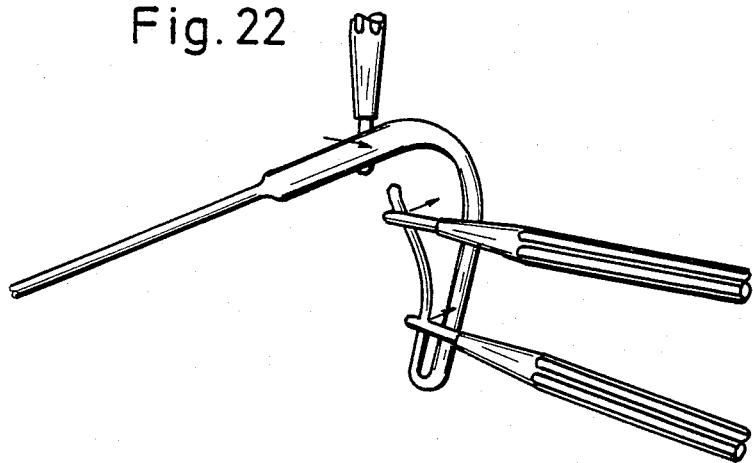
Figure 23:
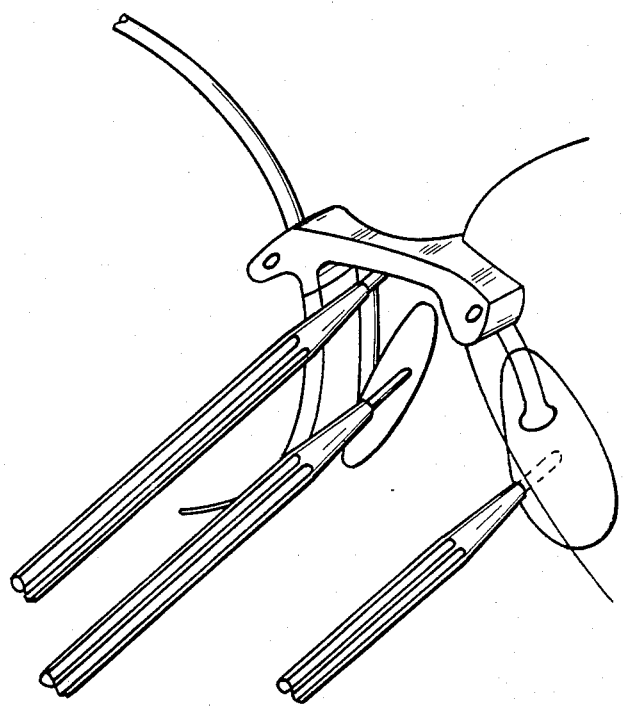
Figure 24:
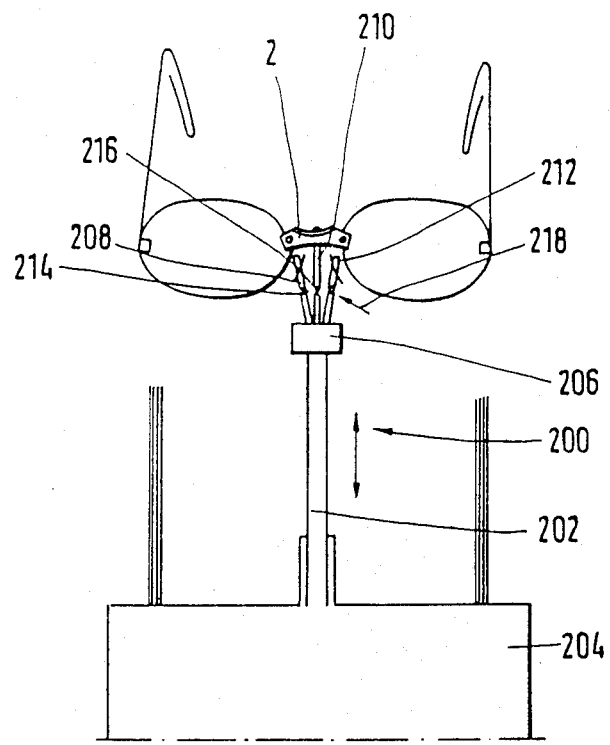
Figure 25:
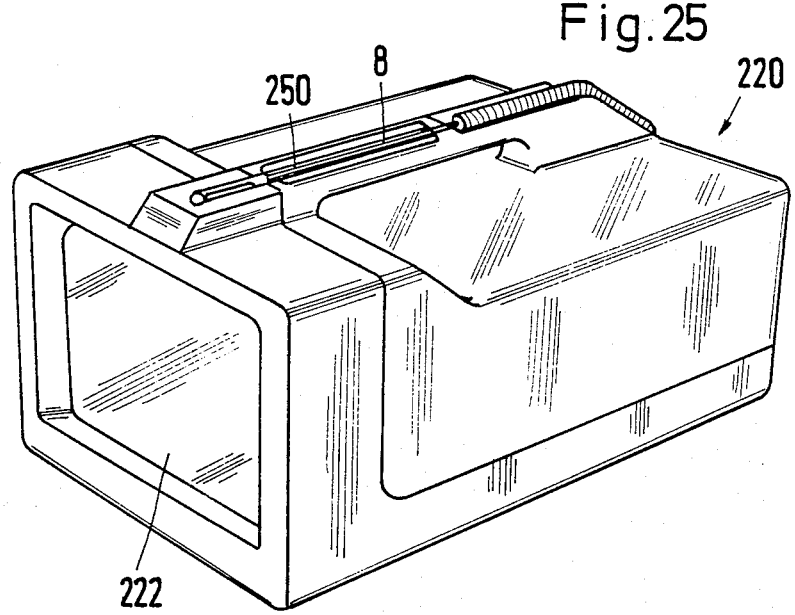
Figure 26:
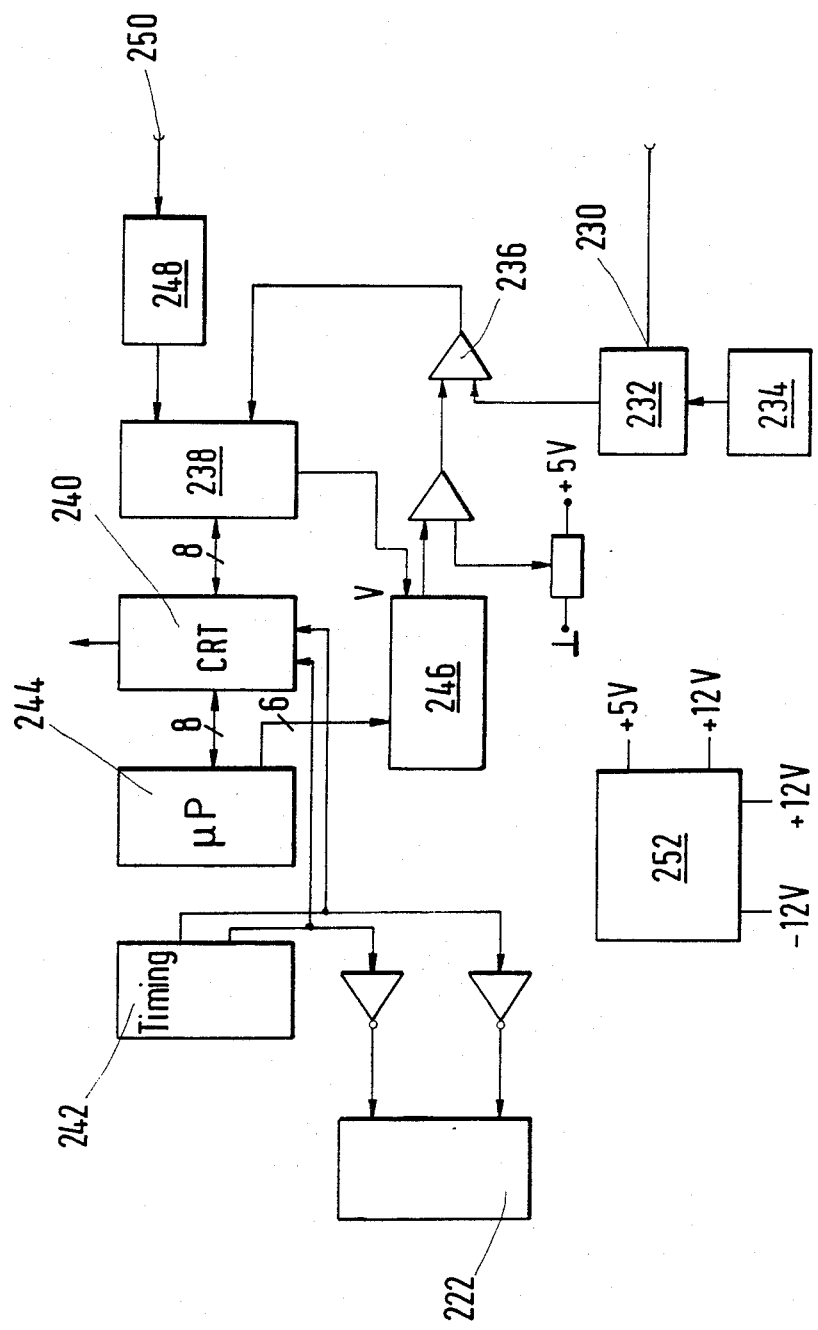

Several embodiments are described in greater detail in the following, with reference to the schematic drawings:

FIG. 1 schematic view in perspective of a spectacle frame to make clear the chief critical points of contact with the spectacle frame and the head of the spectacle wearer;

FIG. 2 view in perspective of a preferred embodiment of the device according to the present invention to determine the forces in the region of the contact surfaces between the spectacle frame and the head in the form of a simple probe for manual operation;

FIG. 3 a view in section drawn on an enlarged scale of the sensor head of the device in accordance with FIG. 2 in a sectional direction along the line III—III in FIG. 2;

FIG. 4 schematic partial sectional view of a further embodiment of the simple probe;

FIG. 5 a further embodiment of the simple probe in a view similar to that of FIG. 4;

FIG. 6 three-dimensional view drawn on an enlarged scale of the anterior region of the probe shown in FIG. 5;

FIG. 7 longitudinal section through the tip of the sensor in the form of the models according to FIG. 5 and 6;

FIG. 8 further embodiment of the simple probe similar to the representation in FIG. 7;

FIG. 9 form of an embodiment of a simple probe corresponding to that in FIG. 2 in a view corresponding to that in FIG. 8, but with the details shown of the displacement receiver;

FIG. 10 top view on an enlarged scale of a resistive wire strain employed in the embodiment according to FIG. 9;

FIG. 11 side view of the resistive wire strain shown in FIG. 10;

FIG. 12 longitudinal section through the tip of the sensor of the form of the embodiment according to FIG. 9 with the casing of the sensor head removed;

FIG. 13 top view of the sensor head according to FIG. 12;

FIG. 14 sectional view of the sensor head for the embodiment according to FIG. 9;

FIG. 15 schematic illustration of a hinge device between sensor head and holder;

FIG. 16 view from above of the sensor section shown in FIG. 15;

FIG. 17 view of a sensor tip employed for measuring the contact area between the spectacle frame and the head in the region of the base of the ear;

FIG. 18 view drawn on an enlarged scale of Detail XVIII in FIG. 17;

FIG. 19 three-dimensional view of a further embodiment of the sensor with a revised form of the sensor tip;

FIG. 20 view corresponding to that in FIG. 19 of a schematic representation of a further embodiment of the sensor;

FIG. 21 longitudinal section through a further embodiment of the sensor;

FIGS. 22 & 23 three-dimensional views of spectacle frame parts to clarify the possibilities of the tip testing by means of the pressure measuring probe according to the present invention;

FIG. 24 schematic representation of a multiple probe;

FIG. 25 three-dimensional view of the entire device for determining the contact forces between spectacle frame and head of the spectacle wearer; and FIG. 26 block diagram for illustrate the processing of measurement signals in the device.

In FIG. 1 with the reference numeral 1 a spectacle frame is shown having a bridge 2, two nose pads 3, two side joints 4 and two temples 5. The black points A schematically indicate the contact surfaces between the spectacle frame 1 and the head of the wearer such as are critical for the comfort of the spectacles in wearing. The contact surfaces in the region of the nose flanks are shown with $A_1$; the contact surfaces in the area of the bridge of the nose are shown with $A_2$; the contact surfaces between the temple 5 and the upper region of the base of the ear are shown with $A_3$; and those contact points that are located behind the ear in the so-called furrow of the base of the ear are shown with $A_4$. When the spectacle frame is fitted properly on the head the contact forces in the area of the contact surfaces A are held in such a manner that a more or less symmetrical distribution of forces is present, i.e., no contact-force peaks occur at any of the contact surfaces. For the purpose of testing any exact location of a peak on the spectacle frame the device will serve as described in closer detail with reference to the FIGS. 2 through 25, with which device the forces in the region of the contact surfaces between the spectacle frame 1 and the head of the spectacle wearer can be measured precisely and in a manner susceptible of reproduction.

The device drawn in FIG. 3 represents a measuring probe 8 consisting of essentially three parts. On its front end a handle-like holder 10 carries a pressure sensor 12, which is shaped at least in the region of the tip in plate or blade form so that it can be applied to each respective contact surface A without somewhat altering the controlled vane position between the spectacle frame and the head of the spectacle wearer. For this purpose the pressure sensor tip 14 is shaped extremely flat, which will be evident, for example, from the sectional representation according to FIG. 3. The height $H_{14}$ is approximately of the magnitude of 0.6 to 0.08 mm, so that for example, when the pressure sensor 12 is inserted below the spectacle frame, no impairment of the supporting conditions of the other contact surfaces will be caused.

The pressure sensor tip 14 of the embodiment according to FIG. 2 is tongue-shaped so that all critical contact surfaces A between the spectacle frame and the spectacle wearer can be reached with the pressure sensor. To enhance the ease in inserting the sensor 12 between the surface of the skin and the spectacle frame, the components of the sensor tip are rounded off, so that no canting or blocking of the sensor tip can occur. The third part of the measuring probe 8 is composed of a signal converter with the pertinent signal processing device, of which only the electrical terminals are visible in FIG. 2.

The conversion of any signal corresponding to a force in the region of the contact surface into an electrical signal is accomplished via the signal converter, which electrical signal is then processed in an appropriate form—as will be more closely described at a later juncture. This conversion is accomplished in the embodiment according to FIG. 2 and 3 through the fact that displacement proportional to the force is directly measured and that this displacement is then converted via conceivably a transposition into an electrical signal proportional to it. The maximum measurement displacement is indicated in FIG. 3 by $W_M$, which lies in the order of magnitude of 0.1 mm. The structure of a pressure sensor such as this will be discussed in closer detail with reference to FIG. 9. But it should be emphasized that the conduct of this measurement is not limited to an electromechanical principle. It is also possible to operate the pressure sensor 12 on the basis of other physical effects, which will be explained in the following in greater detail with reference to the embodiments according to FIGS. 4 through 8.

FIG. 4 shows a measuring probe 20, which like the measuring probe 8 is constructed as a simple measuring probe and which also has a holder 22 and its own pressure sensor 24. Under reference number 26 a connecting wire is indicated which leads to a signal processing device not shown in any more detail. In this embodiment the holder 22 carries a sensor head 28 designed in the form of a hollow casing and which has a rear segment 30 and a tip segment 32, which is dimensioned in the same manner as the sensor tip according to FIGS. 2 and 3. In the tip segment 32 of the sensor are recess 34 is provided having preferably exactly determined geometric design, all the way through which a synthetic bubble 36 extends, which is filled with compressed gas and is connected to a pressure sensor 38. The automatic regulation of pressure in the synthetic bubble is accomplished via a pressure line 40. The measuring probe 20 functions is such a manner that the pressure difference which arises when the bubble 36 is charged by the measurement force $F_M$ is measured in the gas pressure sensor 38, is converted there into an electrical signal and is finally evaluated electrically.

As a variant of the embodiment shown in FIG. 4, an additional recess can be provided for the synthetic bubble 36 on the side of the sensor head 28 facing the contact surface A, so that the normal forces exclusively are detected by the synthetic bubble 36 that are caused by the support of the spectacle frame on the body 42. A more or less large initially applied pressure force with which the sensor head 28 is pressed by the person operating the measuring probe against the surface of the body 42 can no longer distort the measurement results. This is especially of importance since the forces to be measured range in the magnitude of 1 through 100 mN.

In FIG. 5 through 7 a further embodiment of the device in accordance with the present invention is shown. This measuring probe according to FIG. 5 is indicated by 50 and has in turn a holder 52, which can be shaped in the form of a handle. In addition, a sensor head 54 is provided, which by comparison to the above described embodiments is designed in a rather simplified manner. The sensor head 54 carries a foil-like measuring tongue 56, which can be formed as a flexible measuring lobe that can adapt itself to the contact surface A between the body 42 and the spectacle frame (not shown). In the front region of the measuring tongue 56 a defined prominence 58 is provided, which will preferably have a defined area of a predetermined area content. Below this area 58 signal converters in the form of coils, condenser plates or Hall element pairs are provided which are incorporated into an electrical circuit in such a manner that with any alteration in the interval of the signal converters to one another a signal corresponding to this is produced. This will be explained more closely in the following with reference to a capacitively operating signal converter. This signal converter, as seen in FIG. 6 and 7, has two condenser plates 60 and 62, which stand at an interval $A_U$ to one another when the measuring tongue 56 is in the uncharged state. The condenser plates are each imbedded in a border layer 64 and 66, in which the power supply is also provided for the condenser plates. Between the border layers 64 and 66 an intermediate layer 68 has been provided, which is composed of soft plastic, which can be compressed under pressure. When thus the measurement force $F_M$ works on the measuring tongue in the region of the condenser plates 60 and 62, the interval will decrease between the condenser plates, through which means the circuit in which the condenser plates are integrated will produce a signal equivalent to the force, which is finally evaluated. A measuring probe of this sort works in this manner in a similar manner if coil elements or Hall elements are used instead of condenser plates. The especial advantage of this embodiment lies in the fact that the measuring tongue 56 in the contact surface area A can be inserted without exerting a force by virtue of the suppleness of the foil, so that in manipulating the measuring probe 50 no distortions of the measuring result can be caused.

A further embodiment of the device is shown in FIG. 8. This measuring probe is indicated with the reference numeral 70 and operates according to the principle of the piezoelectric effect. In this embodiment a holder 71 carries a sensor head 72 essentially corresponding to the sensor head according to FIG. 4; in the tip section 74 of this sensor head a piezoelectrical element 76 is located, which is connected via a wire 78 and a connecting cable 80 to an evaluation circuit (not shown). The piezoelectric element 76 extends through a recess (not shown in detail) in the tip section 74, so that it will preferably be charged by the measurement force $F_M$ on a defined measuring surface. By virtue of the mechanical stressing of the piezoelectric element 76 a tension following a certain set of principles will be generated which then can be amplified and evaluated.

In this embodiment it can also be advantageous to provide an additional recess in the tip section 74 on side facing the contact surface A for the piezoelectric element in order to minimize distortions of measurement data.

With reference to FIG. 9 through 14, the measuring probe 8 functioning according to the electro-mechanical signal converter principle will be described in the following, as has already been schematically demonstrated in FIG. 2. For this reason the reference numerals according to FIG. 2 are used for analagous components. In this preferred embodiment the core of the pressure sensor 12 is formed by a pair of measuring tongues 82 and 84, which are represented in detail in FIGS. 12 and 13. The measuring tongues 82 and 84 extend essentially parallel to one another away from a sensor head casing 86 parallel to the axis of the holder 10. Both measuring tongues are angular in shape and with their angular segments 88 and 90 remain in pemanent contact with shanks 92 and 94 of a signal conversion element 96, which is shown in detail in FIG. 12. For this purpose set screws 98 and 100 have been provided. The shanks 92 and 94 are bridged by a yoke-like bridge 102, which functions as a defined bending point. The yoke-shaped bridge 102 carries a resistive wire strain 104, which is shown in FIG. 10 and 11. The resistive wire strain can be either glued on or vaporized on, and it is connected to an electrical evaluation circuit via electrical wires 106.

It can be seen from the representation in accordance with FIG. 9 that when the upper measuring tongue 84 is charged with the measurement force $F_M$, the signal conversion element 96 is subjected to a bending stress transposed by the angular shaped confirguration of the measuring tongues and this bending stress causes a traction which is picked up by the resistive wire strain 104.

For the purpose of preparing a defined point of the application of stress, the upper measuring tongue 84 has a protruding area 108 in the region of its projecting end, which area is intended for coming into contact with the corresponding segment of the spectacle frame. Since this thickness of the measuring tongue 84 only lies only within the range of 0.2 and 0.5 mm, the lower measuring tongue 82—as may be seen more clearly in FIG. 13—forms an enclosure for the upper measuring tongue 84. For this purpose the lower measuring tongue 82 has a recess 110 adapted to the contour of the upper measuring tongue 84, so that the latter is protected by a surrounding enclosing border against uncontrolled charges.

The attachment of the assembly elements shown in FIG. 12 and 13 consisting of measuring tongues 82 and 84 and the signal conversion element 96 on the sensor head housing 86 will be evident in detail from FIG. 14. Here this unit is shown in dash-dot lines. A firm gripping of the angular segment 88 in the back lower part of the housing 86 is accomplished by means of a pair of set screws 114 and 116 schematically shown in the drawing, as well as by a set screw pair 118, and the housing 86 is equipped with an aperture to accommodate a functional insertion by the holder 10.

The measuring probe 8 shown in the FIGS. 9 through 14 will thus precisely transmit the contact forces between the spectacle frame and the body 42 of the spectacle wearer if the housing 86 of the sensor head is kept free of those forces which are caught by the handle to the contact surface A. In order to minimize such external forces such as could distort the measurement results, a hinge device with several rotation degrees of freedom will be preferably interposed between the holder and the sensor head housing. One preferred embodiment of such a hinge device is shown in FIG. 15 and 16. It is comprised of a first swivel joint 122 and a second swivel joint 124. The first swivel joint 122 has an axis of hinge 126 that stands at right angles to the vertical level of symmetry 128 of the measuring probe. The axis of hinge 130 of the second swivel joint 124 coincides with the axis of the holder 10. The holder has a guide borehole 132 for the configuration of the swivel joint 124, into which borehole an intervening hinge element 134 grips. The end of this intervening element 134 facing the borehole 132 forms the first half of the first swivel joint 122 in the shape of a hinge joint. The second half 138 of the hinge joint is formed by an end of a connecting pin 140 of the housing 86. The hinge is stabilized by means of a spiral spring 142. This rotational movement of the pin hinge 124 is arrested by a stop and guide pin 144, which can slide in a detent 146 of a guide stop 148 of the holder 10. The hinge devices 122 and 124 are covered by a pleated bellows 150 so as to protect the moving parts from external influences.

With the aid of these hinges 122, 124 the holder 10 can be applied manually all but completely free of any compulsive forces to any point on the contact surfaces A to be examined, whereby the tip of the sensor will adapt easily to the substratum. To improve the measurement results an additional device can be provided which during the measuring process itself will see to it that the spring stabilization of the hinge 122 is stopped in its function by unlocking it.

In the above measuring probes were described that had at least one level contact surface on one side. By virtue of its tongue-shaped configuration this design in itself takes care that contact forces are measured in multiply curved regions of the surface. In FIGS. 17 through 20 additional embodiments of sensor are shown which are especially suitable for measuring contact forces on complexly curved contact surfaces. In FIG. 17 a sensor tip is indicated under the reference numeral 152 which in turn has two measuring tongues 154 and 156 for electro-mechanical signal conversion. The sensor tip 152 is constructed in such a manner that it is especially suited for measuring the contact forces between the spectacle frame and the head of the spectacle wearer in the region 158 of the base of the ear on the skull of the spectacle wearer. For this purpose the two outer ends of the measuring tongues 154 and 165 are bent, so that they adapt according to the form of the furrow 160 of the ear 162. The movable measuring tongue 156, in turn, has a prominence 164 on which the measurement force $F_M$ is intended to be introduced. It will be seen from the illustration that when this measurement force is introduced, there will be a relative shifting between the measuring tongues 154 and 156 which then can be converted into an electric signal equivalent to the force by means of a signal conversion element.

In FIG. 19 a further variant of the configuration of the tip section of the measuring tongues is shown. The measuring tongues are indicated by the two reference numerals 164 and 166. In this refinement not only does the shape of the measuring tongue adapt to the contour of the ear base in a level vertical to the line of the ear base, but in addition to this in a level in which the ear base itself lies. The tip section of the measuring tongue 164 thus assumes the shape of a partial torus surface, whereby even in this refinement the possibility is afforded of surrounding the measuring tongue 166 with an enclosing border 168.

The refinement of the sensor tip according to FIGS. 17 to 19 is also possible in all those instances in which no measuring tongues with movements relative to one another are used, but in which a housing of the sensor head continues as far as in the tip region of the measuring probe. This is shown schematically in FIG. 20. Under the reference numeral 170 a sensor head is indicated in general which carries a tip 172 that is adapted to the surface shape of the head section on which the measurement of the fit of the spectacles is to be taken. In this tip section 172 a force receiver 174, for example, in the form of a piezoelectric element or a synthetic bubble, is installed which is coupled to a signal converter 176 via a connecting wire (not shown).

For the purpose of being able to measure the contact forces as accurately as possible, an assortment of sensor tongues or sensor tip sections can be produced with different shapes and contours and made available to the physician or optician for fitting a variety of sensor tips on the holder.

In FIG. 21 a further embodiment is shown schematically of a pressure sensor in which the input variable in turn is converted by electro-mechanical means into an output signal assigned to the measurement force FM. In this embodiment two measuring tongues 180 and 182 are provided, which in turn function as displacement receivers. Deviating from the embodiments according to FIGS. 2, 3, and 9 through 14, both measuring tongues 180 and 182 are fixed in the pressure sensor head. A common axis 186 is provided for this purpose, around which the measuring tongues 180 and 182 can be moved. Each measuring tongue is shaped as a two-armed lever. The level sections 188 and 190 opposite the protruding end are permanently coupled to the signal conversion element 192, which is put under tension when the measuring tongues 180, 182 are stressed by the measurement force $F_M$. The signal conversion element 192 can, in turn, carry a resistive wire strain or be constructed as a piezoelectric element. The advantage of this embodiment lies in the fact that even when no provision is made for the above-described hinge device between the pressure sensor head and the holder, the normal force in the region of the contact surface will be detected exclusively and measured.

In FIG. 22 and 23 it is shown how a simple measuring probe can conduct measurements in sequence an different contact surfaces. The embodiment of the device shown in FIG. 24 will serve to reduce the number of the chronologically succeeding measurement steps in checking the fit of spectacle frames. This measuring probe indicated by the reference numeral 200 is constructed as a multiple-measuring probe. On a supporting arm 202, which can repose on a movable sliding carriage 204, a multiple measuring head 206 is mounted, which bears a number of pressure sensors 208 through 212, which can be constructed identically to the pressure or force sensors described in the above. The pressure sensors 208 through 212 will preferably be connected to pressure sensor heads assigned to them that can be moved by the multiple measurement head 206. With this device it will be possible to conduct force or pressure measurements at several contact points A simultaneously, which is of especial advantage in the region of the bridge of the spectacle 2.

FIG. 25 shows a measuring set consisting of the pressure measuring probe 8 and a preferably portable measuring instrument 220, which in addition to the evaluation circuitry already described in the above has a monitor 222 to show the signal produced by the pressure sensor, with which monitor the individual measurements can be displayed in their entirety in a manner that can be readily viewed.

The measurement set can be operated in two ways, viz. for measuring and for calibration. In FIG. 26 the components of the measurement set according to FIG. 25 are illustrated by means of a block diagram showing the flow pattern of the measurement signals. It will be seen from this representation that the measurement signal entering into the device at position 230 is fed via a measurement amplifier 232 with the aid of an oscillator 234 to an operation amplifier 236. The signal is processed with the aid of an A/D converter 238 for transforming the analog measuring current into a digital signal. A picture producing system may also be seen consisting of a monitor controller 240 with a character generator and a unit 242 for timing the vertical and horizontal synchronization signals for the monitor screen 222. The picture processing and monitor is controlled by means of a microprocessor 244, which also assumes control of a A/D converter 246 for converting the digital measurement data into the analog corrector voltage for the automatic zero condition. The measurement set thus possesses a control component for automatic recalibration for the sensor during operation. A socket-power unit 252 sees that the units are supplied with a suitable operating current.

A starting logic block indicated by the reference numeral 248 sets the signal processing in motion. This starting logic block is controlled by a keying device 250, which will preferably be located in the holder, as shown in the illustrations.

As shown schematically in FIGS. 8 and 9, the pressure sensor tip can be covered with a plastic casing 75 and 85 in order to screen off the sensitive portions of the measuring probe from external disturbances.

In variation to the above described embodiments, the device can also be constructed in such a manner that one or several pressure sensors are installed as separate element in the pertinent contact points between the spectacle frame and the head of the spectacle wearer and connected via electrical terminals to a signal evaluation circuit. When the connections are made, the spectacle frame is put on, whereupon the individual the individual pressures at the pertinent points of contacts can be ascertained in sequence or simultaneously and recalled.

In a further modification of the embodiments depicted it will also be possible also to equip the hinge device with hinges having translatory degrees of freedom to supplement the hinges with rotary degrees of freedom, in order achieve the best adaptation possible free of any compulsory forces.

The present invention thus furnishes a device for testing for a perfect fit of spectacle frames on the head of the spectacle wearer. The device has at least one plate- or blade-shaped force or pressure sensor, which is mounted on a holder and can be applied to the respective contact surfaces between the frame and head. With this device it is possible to make precise measurements of the forces and pressures actually occurring at each individual point so that they can be reproduced, for example, by raising the frame slightly, introducing the pressure sensor to the pertinent point of contact, and lowering the frame down again. Because of the negligible structural height of the pressure sensor, the individual contact areas between the frame and head can be tested without having to make any change in the controlled vane position in space existing when the spectacles are worn in place.

We claim:

1. A device for measuring contact forces between a spectacle frame and the head of a spectacle wearer comprising: a rigid holder; a sensor for measuring forces directed in a first direction, said sensor being comprised of a transducer and an elongated portion having a free end which supports relatively moveable parts insertable between said spectacle frame and the head of a wearer, said elongated portion being engageable with said transducer such that relative movement of said relatively moveable parts in said first direction causes said transducer to provide a signal which represents the contact force to be determined; and a flexible hinge having a pivot axis which extends substantially perpendicular to said first direction, said hinge having a portion on one side of said pivot axis connected to said sensor and a portion on the other side of said pivot axis connected to said rigid holder, said hinge being of sufficient flexibility relative to said rigid holder so as to prevent movement of said holder in said first direction from appreciably affecting measurement of said contact forces.

2. The device of claim 1, wherein said hinge is also pivotally moveable about a second pivot axis which is perpendicular to both said first pivot axis and to said first direction.

3. The device of claim 2, further comprising a releasable spring for stabilizing said hinge from rotation about at least one rotational axis.

4. The device of claim 1, wherein said elongated portion is tongue shaped.

5. The device of claim 1, further comprising a protruding measurement contact surface on said elongated portion.

6. The device of claim 1, 4 or 5, wherein said transducer is a strain gauge.

7. The device of any one of claims 1, 4 or 5, wherein said transducer comprises a piezoelectric element.

8. The device of any one of claims 1, 4 or 5, comprising a plurality of said pressure sensors each connected by a hinge and rigid holder combination to a single moveable holder.

9. The device of any one of claims 1, 4 or 5, wherein said free end has a thickness of less than 0.75 mm.

10. The device of claim 1, wherein said elongated portion comprises two essentially parallel scanning tongues.

11. The device of claim 10, wherein said transducer is a piezoelectric crystal element, said scanning tongues engaging said piezoelectric crystal element.

12. The device of claim 10, wherein said transducer comprises a resistive wire strain gauge.

13. The device of claim 12, wherein said transducer is mounted upon a U-shaped bracket having a pair of legs respectively connected to the two scanning tongues and a connecting bridge between said legs which comprises a bendable section.

14. The device of claim 12, wherein a first one of the scanning tongues together with said transducer is permanently connected to said hinge.

15. The device of claim 12, wherein said first one of the scanning tongues permanently connected to the pressure sensor head has a recess surrounded by a circumferential border bar for receiving a moveable second scanning tongue.

* * * * *